F. MATHEWS.
WEATHER STRIP DEVICE FOR CAR DOORS.
APPLICATION FILED SEPT. 18, 1913.

1,084,650. Patented Jan. 20, 1914.

WITNESSES: INVENTOR.
Fred Mathews
BY Barnett & Truman
ATTORNEYS

UNITED STATES PATENT OFFICE.

FRED MATHEWS, OF CHICAGO, ILLINOIS, ASSIGNOR TO CLINTON C. MURPHY, OF CHICAGO, ILLINOIS.

WEATHER-STRIP DEVICE FOR CAR-DOORS.

1,084,650.   Specification of Letters Patent.   Patented Jan. 20, 1914.

Original application filed March 24, 1913, Serial No. 756,425. Divided and this application filed September 18, 1913. Serial No. 790,411.

*To all whom it may concern:*

Be it known that I, FRED MATHEWS, a citizen of the United States, residing at Chicago, in the county of Cook and State of Illinois, have invented certain new and useful Improvements in Weather-Strip Devices for Car-Doors, of which the following is a specification.

My invention relates to weather-strips for car doors and has for its object the provision of a weather-strip device for effectively closing the space or crack between the edge, for example, the rear edge of a sliding freight car door and the door frame, so as to prevent rain, cinders, sparks, etc., from entering the car through said space when the door is in closed position, which device will be inexpensive to manufacture, easily applied to the car, and so constructed that it will be effective even if the parts should become somewhat bent or injured with usage.

The invention has for further objects the arrangement, construction and combination of parts hereinafter more specifically described and claimed.

The preferred form of my invention is illustrated in the accompanying drawing, in which similar characters of reference designate corresponding parts, and in which—

Figure 1:
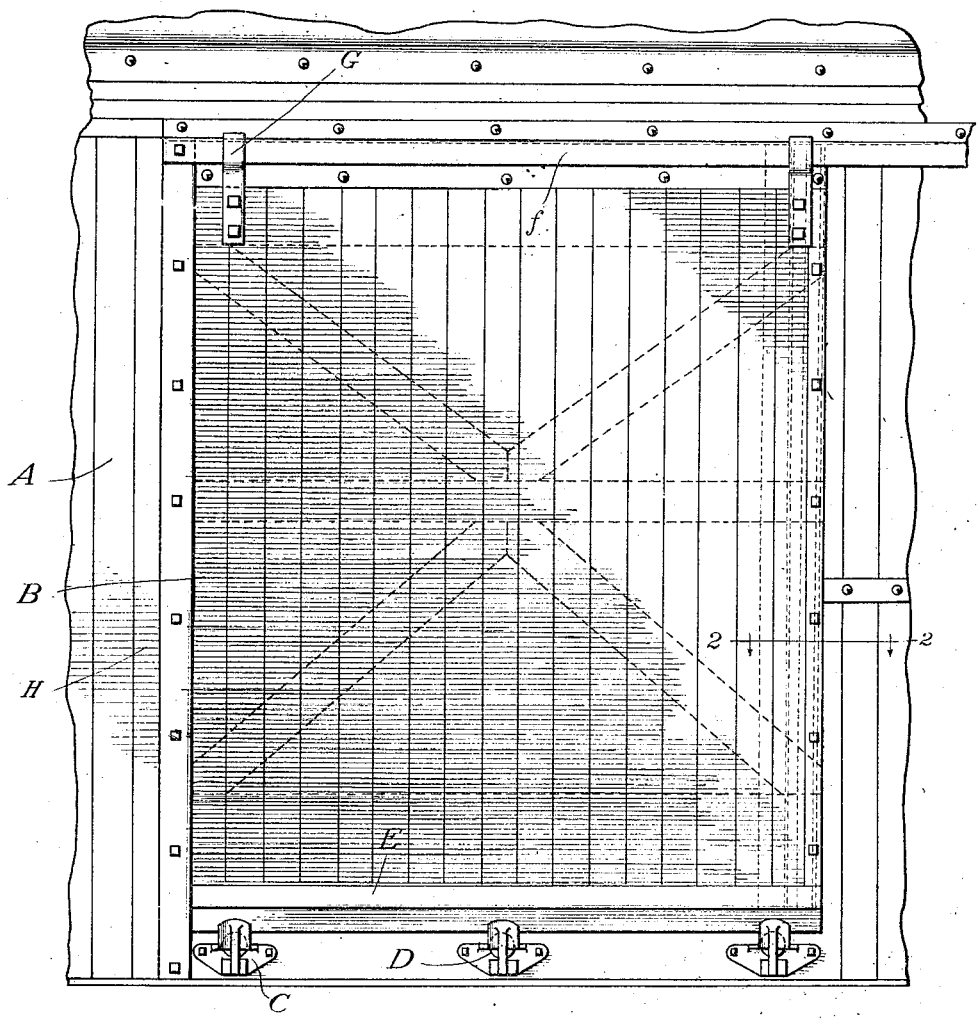
Figure 2:
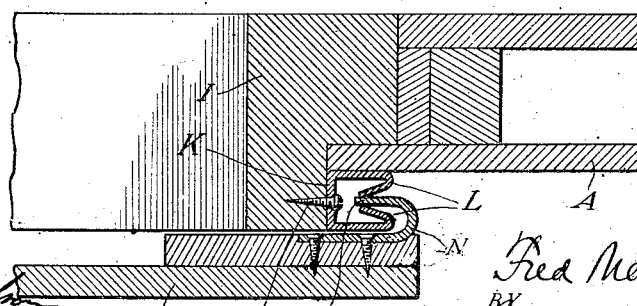

Figure 1 is a fragmentary side elevation of a box car showing a sliding door in closed position, with my improved weather strip applied thereto, and Fig. 2 is a section taken on line 2—2 of Fig. 1.

Referring to the drawings, A designates the side wall of the car which is formed with the usual door opening.

B designates the door which may be of any preferred construction. The door may be supported in any suitable manner, though I preferably support it by means of brackets C secured to the car below the door which are provided with rollers D, the lower edge of the door being provided with a Z-bar E, the lower vertical flange of which bears upon the rollers D.

Secured to the side of the car above the upper edge of the door is a Z-bar F, the lower flange $f$ of which extends in front of the upper edge of the door. This arrangement, in addition to providing means for retaining the upper edge of the door, also forms a water shed which directs any water dripping from the eave of the car out over the outer edge of the door B.

In order to provide means for preventing the door from dropping down, should the brackets at the lower edge of the door become broken or displaced, I preferably provide hook elements G which are secured to the upper edge of the doors and which extend over the horizontal flange of the Z-bar F.

Secured to the side of the car at the forward edge of the door opening is a vertically extending stop strip H which preferably extends upward under the lower vertical flange $f$ of the Z-bar F so as to close the opening in the forward end of the Z-bar and prevent the rain from being blown in between the Z-bar and the upper edge of the door at this point, and also limits the forward movement of the door B.

The rear door post I extends beyond the side of the car as shown at J and to the rear face thereof is secured a strip K which is of substantially channel form and is provided with inturned converging flanges L—L. The closure strip K preferably extends from the Z-bar F to the lower edge of the door opening and is secured to the extension J of the door post by any suitable means, as for example by lag screws M.

On the inner face of the door B and near the rear edge thereof is secured a substantially U-shaped strip N, the inner flange O of which extends between the converging flanges L—L of the strip K when the door B is in closed position. The strip K may be so constructed that the flanges L—L will normally stand a short distance away from the flange O of the weather strip N when the door is in closed position, though in order to provide a weather strip that will effectively seal the crack between the door and the door frame so as to prevent dust as well as the rain from entering the interior of the car, I preferably make the elements K and N of spring metal and have the inturned flanges L—L so formed that upon closing the door the flange O of the weather closing strip N will be forced between the inturned flanges L—L. The resilient engagement of the flanges L—L with the flange O, while being tight enough to prevent dust or water from being blown between them, will not prevent the car door from being easily opened when desired.

It will be noted that any rain, dust, cinders, sparks, or other foreign matter which may, by any possibility get by the inturned flanges of the strip K will drop down to the ground through the channel or passageway formed by the strip. The strip K is preferably seated in the corner between the sheathings A and the forwardly projecting part of the corner post I. By this arrangement water is prevented from getting into this corner and rotting away the woodwork. The fastening devices, the screws M, by which the strip is secured to the corner post, are therefore insured a permanently firm anchorage, giving stability and durability to the equipment which it would not have if the part of the door frame structure to which the strip K is fastened were exposed to the weather.

This application is a division of my co-pending application, Serial No. 756,425, filed March 24, 1913.

I do not claim herein the means which is shown for supporting the door, this being the subject matter of the parent case Serial No. 756,425. This application relates solely to the weather-proofing feature of my door construction.

While I have described my invention in its preferred embodiment, it will be readily understood that modifications might be made without departure from my invention. Therefore, I do not wish to limit the invention to the particular construction shown and described except so far as limited by the claim herein.

I claim:

A weather-proofing device for an outside sliding car door comprising a channel-formed member having inturned converging flanges adapted to be arranged in the angular space between the sheathing of a box car and the projecting portion of the door frame thereof, and a strip having a flange adapted to be attached to said door and a flange which is thrust between said inturned flanges of the channel member when the door is closed.

FRED MATHEWS.

Witnesses:
L. A. FALKENBERG,
JOHN B. LAGORN.